Figure 1:
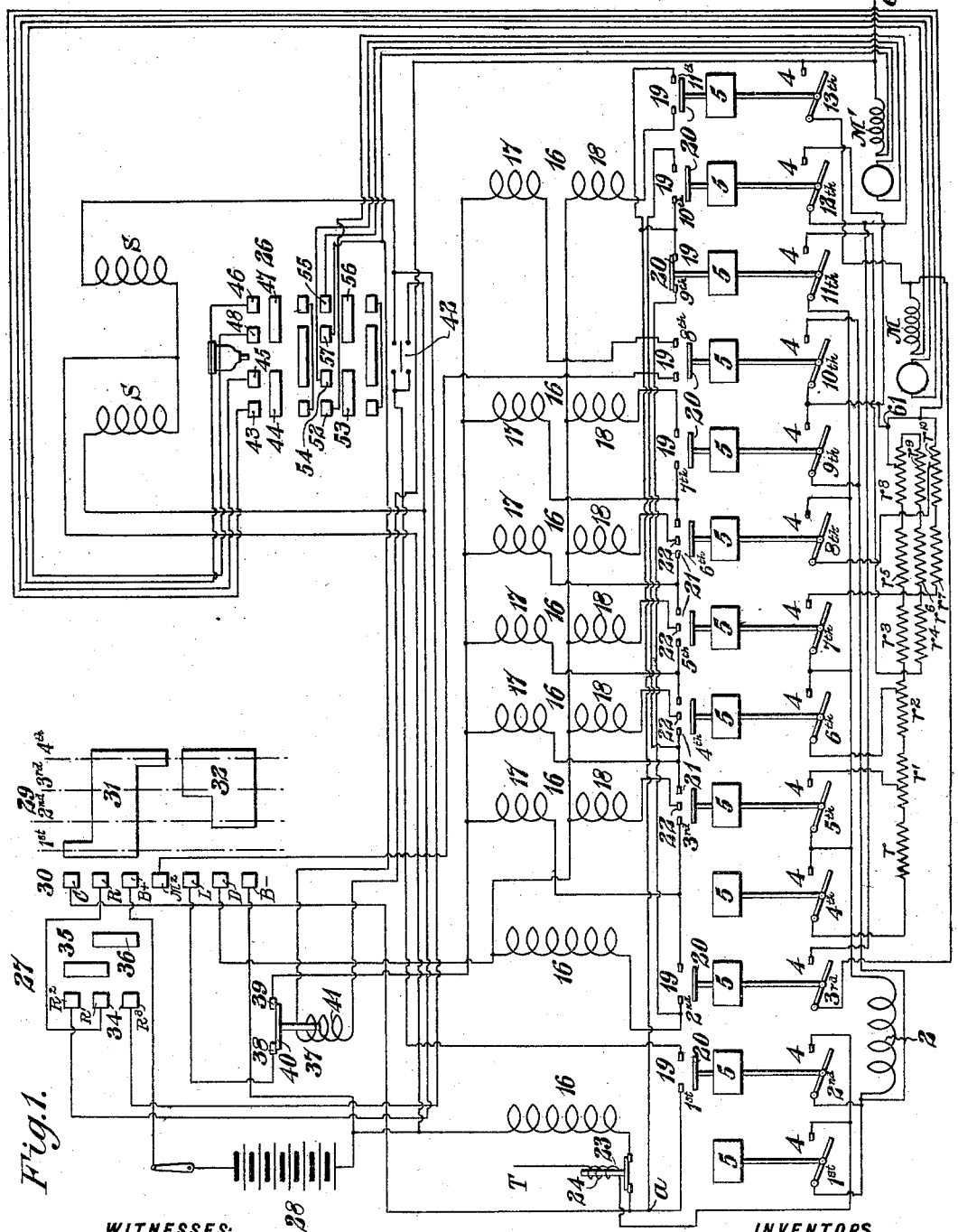

No. 773,833. PATENTED NOV. 1, 1904.
G. WESTINGHOUSE & L. M. ASPINWALL.
CONTROLLING SYSTEM FOR ELECTRIC MOTORS.
APPLICATION FILED MAY 1, 1903.
NO MODEL. 3 SHEETS—SHEET 1.

WITNESSES:
C. L. Belcher
Birney Hines

INVENTORS
George Westinghouse
Louis M. Aspinwall
BY
Wiley S. Carr
ATTORNEY.

No. 773,833. PATENTED NOV. 1, 1904.
G. WESTINGHOUSE & L. M. ASPINWALL.
CONTROLLING SYSTEM FOR ELECTRIC MOTORS.
APPLICATION FILED MAY 1, 1903.
NO MODEL. 3 SHEETS—SHEET 2.

WITNESSES:
C. L. Belcher
Birney Hines

INVENTORS
George Westinghouse
& Louis M. Aspinwall
BY
Whaley G. Carr
ATTORNEY.

No. 773,833. PATENTED NOV. 1, 1904.
G. WESTINGHOUSE & L. M. ASPINWALL.
CONTROLLING SYSTEM FOR ELECTRIC MOTORS.
APPLICATION FILED MAY 1, 1903.
NO MODEL. 3 SHEETS—SHEET 3.
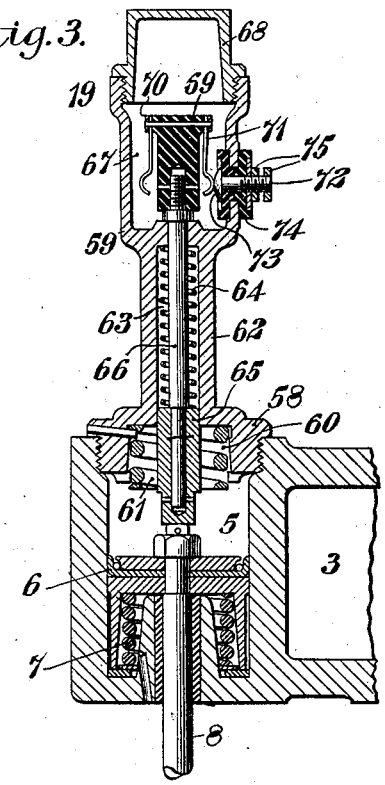
WITNESSES:
C. L. Belcher
Birney Hines
INVENTORS
George Westinghouse
& Louis M. Aspinwall
BY
Wesley G. Carr
ATTORNEY.

No. 773,833. Patented November 1, 1904.

UNITED STATES PATENT OFFICE.

GEORGE WESTINGHOUSE, OF PITTSBURG, AND LOUIS M. ASPINWALL, OF WILKINSBURG, PENNSYLVANIA; SAID ASPINWALL ASSIGNOR TO SAID WESTINGHOUSE.

CONTROLLING SYSTEM FOR ELECTRIC MOTORS.

SPECIFICATION forming part of Letters Patent No. 773,833, dated November 1, 1904.

Application filed May 1, 1903. Serial No. 155,234. (No model.)

*To all whom it may concern:*

Be it known that we, GEORGE WESTINGHOUSE, residing at Pittsburg, and LOUIS M. ASPINWALL, residing at Wilkinsburg, in the county of Allegheny and State of Pennsylvania, citizens of the United States, have invented a new and useful Improvement in Controlling Systems for Electric Motors, of which the following is a specification.

Our invention relates to multiple control systems for electric motors and for motor-driven vehicles and trains; and it has for its object to provide a master-controller or governing-switch of simple construction, and a motor-controller comprising a plurality of independently-operating circuit making and breaking devices, which shall so operate independently of the rate of movement of the master-controller as to effect automatic acceleration of the motor or motors controlled thereby.

Our invention as herein set forth is embodied in a system for controlling electrically-operated vehicles or trains in which the controlling-switches are actuated pneumatically and the application of the pneumatic pressure is governed by electromagnets energized from a battery. It is to be understood, however, that the invention is to be construed as sufficiently comprehensive in its scope to cover systems in which the circuit making and breaking switches are actuated electromagnetically. It is to be also understood that while the controlling system is here specifically set forth as applied to the control of two motors in such manner that they may be connected either in series or in parallel to vary the speed of the vehicle or train propelled by them there is nothing inherent in the system which precludes its use for controlling a single vehicle whether equipped with one, two, or more motors or for controlling motors which are utilized for other purposes than the propulsion of vehicles and trains.

Our invention is illustrated in the accompanying drawings, in which—

Figure 2:
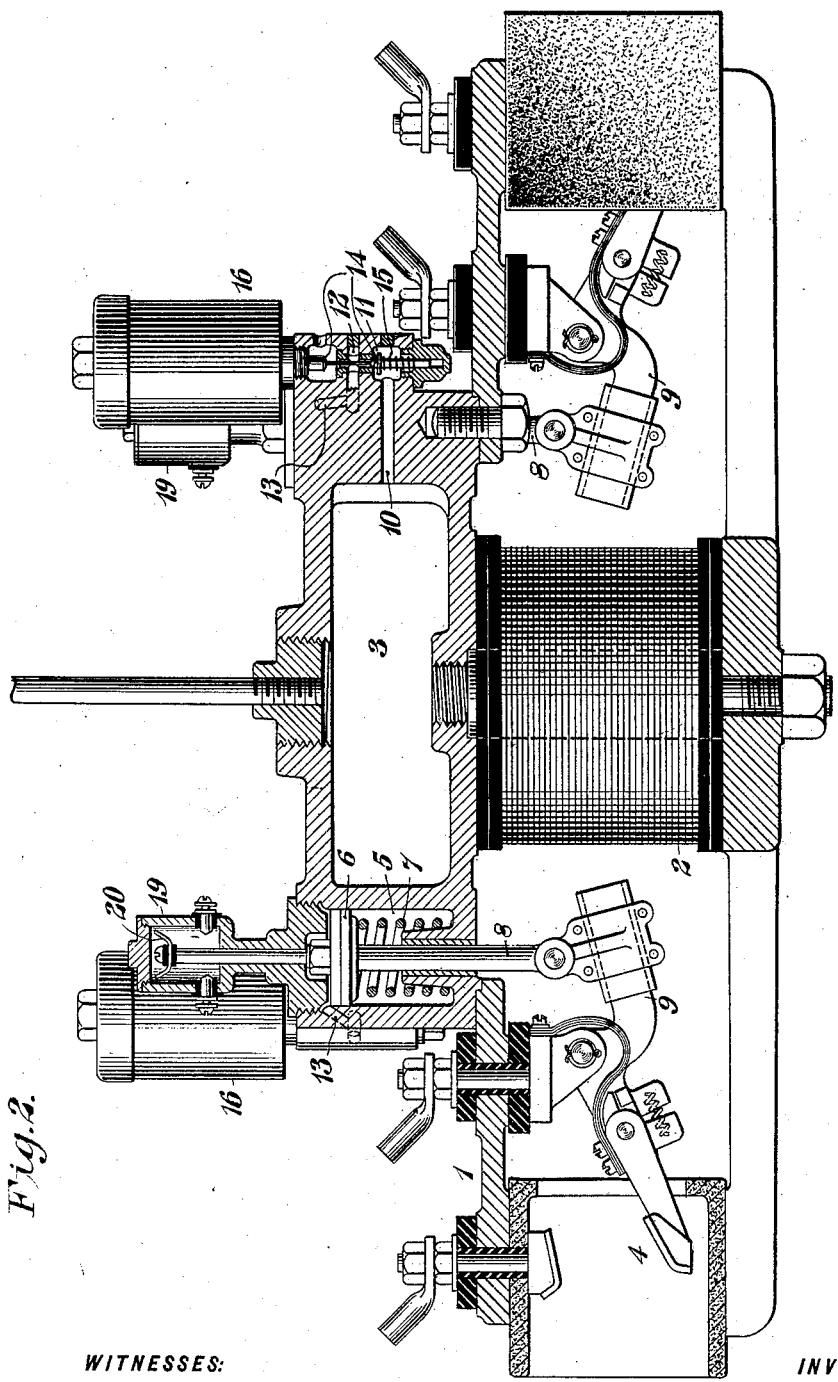

Figure 1 is a diagram of our controlling system as applied to the control of two motors. Fig. 2 is a sectional view of a motor-controller adapted for use as one of the elements of our system. Fig. 3 is a longitudinal sectional view of a modified form of interlock-switch and the adjacent coöperating devices. Fig. 4 is a side elevation of the movable member of the interlock-switch shown in Fig. 3. Fig. 5 is a plan view of a three-point interlock-switch, its casing being in section. Fig. 6 is a longitudinal section of the ninth interlock-switch shown in Fig. 1.

Our invention is an improvement upon that covered by Patent No. 624,277 granted to one of us (George Westinghouse) May 2, 1899, and also upon those covered by patents granted to E. R. Hill, Nos. 682,828 and 684,609, granted, respectively, September 17, 1901, and October 15, 1901, and reference may be had to these patents for such description of details of circuits and apparatus as is not here given.

As hereinbefore stated, our invention contemplates the employment of independently-actuated switches for coupling the motors in series and in parallel and for varying the amount of resistance in their circuit or circuits in order to vary the speed of the vehicle or train driven thereby as distinguished from the employment of a controller having a drum on which are mounted relatively immovable contact-pieces which make coöperative engagement with stationary contact-fingers in order to effect the various changes in the motor-circuits and the resistance thereof. Such changes in structure and mode of operation of the motor-controller obviously involve certain material changes in the circuits and governing apparatus therefor, and these will be specifically set forth.

So far as our invention is concerned the structure of the motor-controller may be made to assume any one of a variety of forms, and that shown in Fig. 2 is presented merely as a satisfactorily-operative combination for use in connection with the circuits of Fig. 1, which cover the essential features of the invention.

The frame 1 of the motor-controller, as indicated in Fig. 2, is of general circular form and is provided with a central blow-out magnet 2, a central air-chamber 3, a series of circumferentially-arranged switches 4, corresponding cylinders 5, pistons 6 in said cylinders, which are held in their outermost positions by means of springs 7, and piston-rods 8, which connect the pistons to the movable members 9 of the switches.

The structural features of the frame, the switches, and the switch-operating mechanism constitute portions of the subject-matter of an application, Serial No. 148,417, filed March 18, 1903, by one of us, (George Westinghouse,) and we therefore illustrate and describe herein only so much of the said apparatus as is necessary to a proper understanding of our present invention.

The switches and corresponding operating devices are indicated in Fig. 1 as thirteen in number, this being a convenient number for making the desired circuit changes; but the illustration is not intended to be restrictive. Compressed air is admitted to the several cylinders 5 above the pistons 6 by means of passages 10, 11, 12, and 13, controlled by double valves 14, that are normally closed by means of springs 15 and are opened by means of electromagnets, the magnets being eight in number, as indicated in Fig. 1. Six of these electromagnets have two coils, 17 and 18, each, the others having single coils. Of the double-coil magnets the upper set, 17, are pick-up coils and are employed for closing the corresponding switches 4, while the lower-coils, 18, are retaining-coils and are utilized to keep the magnets energized after the switches have been closed by means of the pick-up coils.

The switches 4, their operating-cylinders 5, and the magnets 16 are shown in Fig. 1 as arranged side by side in straight lines for simplicity and clearness of illustration, and for convenience of description the said parts will be designated as "first," "second," "third," &c., in left to right progression.

The first magnet serves to actuate the first and second switches 4, the second magnet the third and fourth switches, the third magnet the fifth switch, the fourth magnet the sixth switch, the fifth magnet the seventh switch, the sixth magnet the eighth switch, the seventh magnet the ninth and tenth switches, and the eighth magnet the eleventh, twelfth, and thirteenth switches, the object in utilizing certain of the magnets for closing a plurality of switches being to simplify the apparatus as much as possible. The second, third, ninth, tenth, eleventh, twelfth, and thirteenth switches 4 are arranged to coöperate with two-point interlock-switches 19, the movable members 20 of which are connected to the pistons 6, so as to close the switches at the same time that the corresponding main switches 4 are closed, with the exception of the interlock-switch corresponding to the eleventh main switch 4, which is closed when the main switch is opened and is opened by the closing of the main switch. The fifth, sixth, seventh, and eighth switches 4 are combined with three-point interlock-switches 21, the middle stationary contact-terminal 22 of each of these switches being connected to one terminal of the corresponding retaining-coil 18, the other stationary terminals being connected to the pick-up coils 17 in such order and for such purpose as will more clearly appear in connection with the description of the operation of the system.

A circuit-breaker governing-switch 23 has one stationary contact-terminal connected to one terminal of the first magnet-coil 16, its other stationary contact-terminal being connected to one stationary terminal of the first interlock-switch 19 and to certain other points which will be hereinafter specified. The actuating-coil 24 for the movable member of the circuit-breaker governing-switch 23 is connected by one terminal T, which may be termed the "trolley," to the source of supply of current for the motors and by its other terminal to the stationary contact-terminals of the first and second switches 4, which serve in lieu of the usual circuit-breaker for the motor-circuit.

The reverser 26 for the motors may be constructed and arranged to operate in accordance with the disclosure of the patents hereinbefore mentioned or its movable member may be actuated electromagnetically without the employment of compressed air, as may be desired, the specific means for operating the reverser in accordance with the movement of its governing-switch 27 being no part of our present invention.

The several resistance members or elements $r\ r'$, &c., which are employed in connection with the motors M and M' will be more conveniently described in connection with the operation of the system.

The switch-actuating magnets 16 are energized by means of current from a battery 28, and its terminals are connected to said magnets through a governing-switch or master-controller 29, comprising a series of stationary contact-fingers 30 and a drum provided with contact-strips 31 and 32 and shown as developed into a plane in Fig. 1, and the reverser governing-switch 27, comprising fingers 34 and a movable member having strips 35 and 36. Each of these switches may take the form of any well-known simple form of drum-switch and may be interlocked in the usual manner, so that the reversing-switch can be moved only when the main switch is in its "off" position and so that the main switch may be operated only when the reverse-switch is in one of its circuit-closing positions. The governing-switch may be provided with suitable means for automatically returning it to off position when released, one means for effecting this result being shown in the Hill patent, No. 682,828, hereinbefore referred to.

In addition to the means described for starting, stopping, and accelerating the speed of the motors we provide a limit-switch 37 to take care of fluctuations of current in the motor-circuit that are not sufficient to open the switch 23. The stationary contact-terminals 38 and 39 of the limit-switch are respectively connected to the finger L of the governing-switch and to one terminal of each of the pick-up coils 17, and its movable member 40 is normally in contact with said stationary terminals to close the circuit. An actuating-coil 41 for the movable member has its terminals respectively connected to the terminals of the field-magnet winding of the grounded motor M', so that when the current through the motors exceeds a predetermined safe limit this switch will be opened, and thus prevent the closing of any additional motor-control switches, provided only a part of them have up to that point been closed, as will be more fully set forth in connection with the operation of the system.

As indicated in Fig. 2, the movable members 20 of the interlock-switches are rigidly connected to the corresponding pneumatically-operated pistons 6. While this is an operative construction, we generally find it preferable to employ substantially the construction illustrated in Figs. 3, 4, 5, and 6, of which Figs. 3 and 4 illustrate one of the two-point switches 19 (shown diagrammatically in Fig. 1) and which will be now described.

The head 58 of the cylinder 5 constitutes an integral part of a casing 59 and is provided with a recess 60, in which is located a buffer-spring 61 to receive the impact of the piston 6 when it is forced upward by the spring 7. The stem 62 of the casing 59 contains a chamber 63, in which is located a coiled spring 64, the upper end of which engages the corresponding end of the chamber and the other end of which rests against a plunger 65, which is mounted upon and fastened to the lower end of a rod 66. Rigidly mounted upon the upper end of the rod 66 and within a chamber 67, having a removable cap 68, is a non-conducting block 69, to the upper end of which is fastened a conducting-ring 70 and an annular set of downwardly-projecting spring-arms 71. The stationary contact devices with which the lower ends of at least two of the spring-arms 71 make engagement are shown as having the form of bolts 72, the heads 73 of which constitute the contact portions and the shanks of which are surrounded by insulating-bushings 74 and are provided at their outer ends with binding-nuts 75. It will be seen from the illustration and foregoing description that when the piston 6 is forced downward against the action of spring 7 by means of pneumatic pressure in cylinder 5 spring 64, acting upon the plunger 65, will force the spring-arms 71 downward into engagement with the stationary contacts 73 and that when the air is exhausted from the cylinder 5 the spring 7 will force the piston 6 outward against the buffer-spring 61 and will carry with it the plunger 65 and the parts connected thereto, and thereby open the interlock-switch.

In Fig. 5 the interlock-switch 21 has the same construction as the switch 19 just described, except that the third stationary contact-terminal 22 is shown. Since the other parts have the same structure and arrangement and are designated by the same reference-numerals as the corresponding parts shown in Fig. 3, the foregoing description may be read in connection with what is shown in this figure.

In Fig. 6 we have illustrated the form of interlock-switch 19, which is indicated as the ninth switch of the series shown in Fig. 1. In this switch the coiled spring 76 acts upon the plunger 77 to move the spring-arms 71 out of engagement with the stationary terminals 73 instead of into engagement therewith when the pneumatic pressure is applied to the corresponding piston 6, and, conversely, when the air is exhausted from the cylinder 5 the corresponding spring 7 (not shown in this figure) acts upon the piston 6 to move the spring-arms 71 into engagement with the contact-terminals 73.

The details of construction may of course be further modified within the scope of our invention, the details shown and described being set forth for the purpose of presenting full information as to satisfactorily-operative means for practicing the invention without intention of limiting the invention to such means.

The first, second, seventh, eighth, and tenth interlock-switches of Fig. 1 are represented structurally in Figs. 3 and 4 and the third, fourth, fifth, and sixth interlock-switches of Fig. 1 are represented structurally in Figs. 3, 4, and 5, the only difference between the two sets being in the number of stationary contact-terminals. The eleventh interlock-switch of Fig. 1 has the structure and mode of operation illustrated in Figs. 3 and 4, with the exception that its dimensions are more nearly like those of the ninth switch. (Shown in Fig. 6.) The reason of this variation of dimensions will be hereinafter specified.

In the operation of the system the governing-switch 29 is moved to its first position for the purpose of closing the first and second switches 4, which together constitute the circuit-breaker for the motor-circuit. In this position electrical connection is made between fingers C, R, and B+ by strip 31, and current then flows from the plus terminal of the battery 28 through contact-finger B+, strip 31, finger C, circuit-breaker governing-switch 23, and the coil of the first magnet 16 to the minus terminal of the battery. The circuit-breaker governing-switch 23 is normally closed, as indicated, but is opened automatically when an excessive current of a predetermined amount flows through its coil 24 from the trolley T. The coil of the first magnet 16 being energized as above specified operates the corresponding valve 14 to admit air to the cylinders 5 of the first and second switches 4. The closing of the second switch 4 effects the closing of the first interlock-switch 19, which establishes a circuit from the plus terminal of the battery through contact-finger B+, strip 31, finger R, reverser-governing-switch fingers R' and R² or R' and R³, switch 42 of the reverser 26, circuit-breaker governing-switch 23, and the coil of the first magnet 16 to the minus terminal of the battery, the switch 42 being closed by the action of one of the reverser-coils S, which is connected in circuit with the battery by the reverser governing-switch 27.

The second position of the governing-switch 29 is for the purpose of throwing the motors in series with each other and also in series with a suitable amount of resistance. In this position the engagement between the finger C and the strip 31 of the governing-switch is broken and a branch circuit is established from the point $a$ in the first-position circuit through the ninth interlock-switch, the coil of the second magnet 16 and contact-finger D, strip 32, and finger B— to the minus terminal of the battery. The second magnet 16 being thus energized operates the corresponding valve 14 to admit air to the corresponding cylinders 5 to actuate the third and fourth switches 4. The closing of the third switch 4 serves to close the corresponding interlock-switch 19 and also establishes a motor-circuit from the trolley T through the first and second switches 4, blow-out coil 2, the fourth switch 4, resistance elements $r, r', r^2, r^3, r^5$, and part of $r^8$, reverser-contacts 43, 44, and 45, armature of motor M, reverser-contacts 46, 47, and 48, field-magnet of motor M, the third switch 4, reverser-contacts 52, 53, and 54, armature of motor M', reverser-contacts 55, 56, and 57, and field-magnet winding of motor M' to the ground G.

The third position of the governing-switch 29 is for the purpose of throwing the motors into full-series relation without resistance. In said position contact-finger L is connected to fingers B— and D by strip 32, and the battery-current flows from the battery through contact-finger B+, strip 31, finger R, reverser-governor contacts R' and R² or R' and R³, reverser-switch 42, the first, ninth, and second interlock-switches, the first pick-up coil 17, limit-switch 37, and contact-fingers L and B— to the battery. The energizing of the first pick-up coil 17 causes the fifth switch 4 to be closed, which in turn cuts out the resistance element $r$ and part of the element $r'$ from the motor-circuit. When the fifth switch 4 is fully closed, the corresponding interlock-switch is closed, completing the circuit through the first retaining-coil 18 and contact-fingers D and B— to the minus terminal of the battery. The closing of the third interlock-switch completes the circuit through the second pick-up coil 17, the limit-switch 37, and contact-fingers L and B— to the battery, and the energizing of the second pick-up coil 17 serves to effect the closing of the sixth switch 4, thus cutting out substantially all of section $r^2$ of the resistance. When the sixth switch 4 is fully closed, the fourth interlock-switch is closed, and thus completes the circuit through the second retaining-coil 18 to the battery. At the same time a circuit is established through the third pick-up coil 17 and limit-switch 37 to the battery. The energizing of the third pick-up coil 17 closes the seventh switch 4, which throws sections $r^7$ and $r^{10}$ of the resistance in parallel with the sections previously in circuit. The closing of the seventh switch 4 closes the fifth interlock-switch, which completes the circuit through the third retaining-coil 18 and at the same time completes the circuit through the fourth pick-up coil 17 and limit-switch 37 to the battery. This operation closes the eighth switch 4, which cuts out the resistance-section $r^7$ and most of the section $r^{10}$ from the motor-circuit. Simultaneously the sixth interlock-switch is closed, completing the circuits through the fourth retaining-coil 18 and the fifth pick-up coil 17 to the battery. The energizing of the fifth coil 17 closes the ninth and tenth switches 4, cutting all the resistance out of the motor-circuit and leaving the motors in full-series relation. The closing of the ninth switch 4 closes the seventh interlock-switch, which completes the circuit through the fifth retaining-coil 18.

The fourth position of the governing-switch 29 is for the purpose of throwing the motors in parallel with each other and in series with a suitable amount of resistance. In the said position contact-fingers B+ and M² are connected together by strip 31, and if the above-described progressive action has effected the closing of the eighth interlock-switch the circuit will be completed through the sixth pick-up coil 17, limit-switch 37, and contact-fingers L and B— to the battery. The sixth pick-up coil 17 being thus energized causes the eleventh interlock-switch to close, the ninth interlock-switch to open, and the tenth interlock-switch to close, the several operating means being proportioned, as hereinbefore described, to effect said actions in the order stated. The closing of the eleventh interlock-switch completes the circuit through the sixth retaining-coil 18 to the "minus" terminal of the battery, and the opening of the ninth interlock-switch interrupts the circuit through the coil of the second magnet 16, the first five retaining-coils, and the corresponding pick-up coils, whereby the corresponding interlock-switches and the switches 4 connected thereto are opened. The above-described action of the sixth pick-up coil upon the eleventh, ninth, and tenth interlock-switches obviously effects the closing of the thirteenth, eleventh, and twelfth switches 4, and when the twelfth switch 4 is fully closed the tenth interlock-switch completes the circuit through the second pick-up coil, limit-switch 37, and contact-fingers L and B—. The energizing of the second pick-up coil serves to close the sixth switch 4 and the progressive motion now proceeds, as before described, from the fourth interlock-switch to the fifth, to the sixth, and to the seventh and eighth, thus throwing the resistance gradually out of the motor-circuit and leaving the motors in full parallel. The motor-circuit before the beginning of the above-mentioned progressive action is from the trolley T, through the first and second switches 4 in parallel, through blow-out coil 2, then in two parallel paths one of which is through the sixth switch 4, a part of resistance-section $r^2$, resistance-sections $r^3$ and $r^5$, and part of section $r^8$ and the other of which is through the eleventh switch 4, resistance-sections $r^4$, $r^6$, and $r^9$, and a part of section $r^8$ to a point 61, where the current again divides, one division going through the reverser, the armature of motor M, and its field to ground and the other part going through the twelfth switch 4, the reverser, the armature of motor M', and its field to ground.

It will thus be seen that the cutting out of resistance from the motor-circuits in order to effect gradual speed acceleration from the initial-series to the full-series position and from the initial-multiple to the full-multiple position is surely and automatically effected by a simple means constituting a part of the motor-controller itself, and consequently that the governing-switch may be exceedingly simple in both structure and operation.

It will be observed that each of the governing-circuits established by the governing-switch 29, except that corresponding to its first position, is through the first interlock-switch 19. It follows, therefore, that in case the circuit-breaker-governing switch 23 is opened by an excessive current through its tripping-coil 24 when the governing-switch 29 is in its second, third, or fourth position the circuit-breaker switches 4 will open and they cannot be again closed without returning the governing-switch to its first position. An indefinite and objectionable repetition of the opening and closing movements of the circuit-breaker switches 4 during the time that the excessive current flows is thus avoided.

We desire it to be understood that we do not intend to limit our invention to the employment of two of the motor-controlling switches as a circuit-breaker, since the service might be performed by either one or more than two of these switches. It will be further understood from the illustration and description of the circuits that in case the current in the motor-circuit becomes excessive, but of less volume than is necessary to open switch 23 during the acceleration periods— i. e., while the governing-switch is in either its third or its fourth position—the limit-switch will open the circuit of the pick-up coils, and thereby prevent further acceleration until the current decreases to the safety limit. Since the retaining-coil circuits are not interrupted by the opening of the limit-switch, the operation of the motors at a substantially uniform speed will continue until the power-current falls to the safety limit, provided the governing-switch is not turned backward to off position or to either of positions 1 and 2.

We claim as our invention—

1. In a controlling system for electric motors having resistance elements primarily in circuit therewith, the combination with a manually-operated governing-switch and a series of power-operated motor-controlling switches, of an independent governing-circuit having its own source of current and means included in said circuit for effecting progressive operation of a plurality of the motor-controlling switches without movement of the governing-switch.

2. In a controlling system for electric motors having resistance elements primarily in circuit therewith, the combination with a manually-operated governing-switch and a series of power-operated motor-controlling switches, of an independent governing-circuit having its own source of current and a series of interlock-switches the actuating-coils of which are in said independent circuit, said switches being operated in conjunction with certain of the motor-controlling switches to effect an automatic and progressive variation of the resistance of the motor circuit or circuits without movement of the governing-switch.

3. In a controlling system for electric motors having resistance elements primarily in circuit therewith, the combination with a manually-operated governing-switch and a series of motor-circuit switches, of a series of controlling-magnets for said switches, a plurality of which are severally provided with a pick-up coil and a retaining-coil and a plurality of interlock-switches operated in conjunction with corresponding motor-circuit switches and severally having contact-terminals connected to different pick-up coils whereby the corresponding motor-switches are closed progressively and automatically without movement of the governing-switch.

4. In a controlling system for electric motors having resistance elements primarily in circuit therewith, the combination with a manually-operated governing-switch and a series of motor-circuit switches, of pneumatically-actuated means for closing said switches, a series of controlling-magnets for said closing means, a plurality of which are severally provided with a pick-up coil and a retaining-coil, and a plurality of interlock-switches operated in conjunction with corresponding motor-circuit switches and severally having contact-terminals connected to different pick-up coils whereby the corresponding motor-switches are closed progressively and automatically without movement of the governing-switch.

5. In a controlling system for a plurality of electric motors having resistance elements primarily in circuit therewith, the combination with a manually-operated governing-switch for establishing initial series and initial multiple connections and a series of motor-circuit switches, of a series of controlling-magnets for said switches, a plurality of which are severally provided with a pick-up coil and a retaining-coil, and a plurality of interlock-switches operated in conjunction with corresponding motor-circuit switches and severally having contact-terminals connected to different pick-up coils whereby the corresponding motor-switches are closed progressively and automatically without movement of the governing-switch.

6. In a controlling system for a plurality of electric motors having resistance elements primarily in circuit therewith, the combination with a manually-operated governing-switch for establishing initial series and initial multiple connections and a series of motor-circuit switches, of pneumatically-actuated means for closing said switches, a series of controlling-magnets for said closing means, a plurality of which are severally provided with a pick-up coil and a retaining-coil, and a plurality of interlock-switches operated in conjunction with corresponding motor-circuit switches and severally having contact-terminals connected to different pick-up coils whereby the corresponding motor-switches are closed progressively and automatically without movement of the governing-switch.

7. In a controlling system for railway-motors, the combination with a series of motor-circuit switches, pneumatically-actuated means for closing said switches and springs for opening them when the pneumatic pressure is withdrawn, of a series of controlling-magnets some of which have both pick-up coils and retaining-coils, a source of current and a manually-operated governing-switch all connected in circuit to effect automatic speed acceleration of the controlled motor or motors for a given position of the governing-switch.

8. In a controlling system for railway-motors, the combination with one or more motors and a variable resistance initially in series therewith, of a series of switches for progressively cutting said resistance out of circuit, an independent governing-circuit for said switches having its own source of current and comprising a series of double-coil magnets, a source of current, a manually-operated governing-switch and a series of interlock-switches the operation of which serves to energize the controlling-magnets successively when the governing-switch is in a given position.

9. In a controlling system for railway vehicles and trains, the combination with one or more motors, of a plurality of motor-circuit switches, controlling-magnets therefor, means for energizing said magnets, a manually-operated governing-switch, an independent circuit having its own source of current and a series of interlock-switches the actuating-coils of which are in said independent circuit, said switches coöperating with the motor-circuit switches to effect automatic speed acceleration of the vehicle or train when the governing-switch is in a given position.

10. In a controlling system for electric motors, the combination with a set of power-operated, motor-controlling switches, a plurality of which operate in parallel as the circuit-breaker of the system, of a governing-circuit including a manually-operated governing-switch and a circuit-breaker-governing switch the tripping-coil of which is included in the motor-circuit.

11. In a controlling system for electric motors, the combination with a series of power-operated, motor-controlling switches, a plurality of which operate in parallel as the circuit-breaker of the system, of a governing-circuit including a source of current, a manually-operated governing-switch, a circuit-breaker-governing switch the tripping-coil of which is in the motor-circuit, a series of switch-controlling coils and a series of interlock-switches severally operated by certain of the motor-controlling switches.

12. In a controlling system for electric motors, the combination with a series of motor-controlling switches, one or more of which serve as a circuit-breaker for the system, of a governing-circuit containing a manually-operated controller, a circuit-breaker-governing switch, a series of switch-controlling coils and a series of interlock-switches severally operated by certain of the motor-controlling switches, the governing-circuit being dependent upon the circuit-breaker interlock-switch, except when the governing-switch is in its first position.

13. In a controlling system for electric motors, the combination with a series of motor-controlling switches, one or more of which constitute a circuit-breaker for the system, of a governing-circuit including a source of current, a manually-operated governing-switch, a circuit-breaker-governing switch, a series of switch-controlling magnets and a series of interlock-switches the first of which can be closed only when the governing-switch is in its first position and the others being inoperative when it is open.

14. In a controlling system for electric motors, the combination with a series of motor-controlling switches, one or more of which constitute a circuit-breaker for the system, of a governing-circuit containing a manually-operated governing-switch, a circuit-breaker-governing switch, means for effecting progressive operation of said motor-controlling switches and means for preventing closure of the circuit-breaker except when the governing-switch is in its first position.

15. In a controlling system for electric motors, the combination with a series of motor-controlling switches, one or more of which constitute a circuit-breaker for the system, of a governing-circuit containing a manually-operated governing-switch, means for effecting progressive operation of certain of said motor-controlling switches and means for preventing the closing of the circuit-breaker except when the governing-switch is in its first position.

16. In a controlling system for electric motors, the combination with a power-operated multiple-switch controller and a manually-operated governing-switch therefor, of means for opening one or more of the switches when the power-current is excessive and means for maintaining the open condition of the power-circuit until the governing-switch is moved to its first position.

17. In a controlling system for electric motors, the combination with a series of power-operated, motor-controlling switches, one or more of which constitute a circuit-breaker for the system, of a governing-circuit having a manually-operated governing-switch, a circuit-breaker-governing switch, means for effecting successive operation of certain of the motor-controlling switches without movement of the governing-switch and means for interrupting the successive operation when the motor-current becomes excessive.

18. In a controlling system for electric motors, the combination with a series of power-operated, motor-controlling switches, one or more of which constitute a circuit-breaker for the system, of a governing-circuit having a circuit-breaker-governing switch, a manually-operated governing-switch and a series of switch-controlling magnets and interlock-switches which can be started in operation only when the manually-operated governing-switch is in its first position.

In testimony whereof we have hereunto subscribed our names this 29th day of April, 1903.

GEO. WESTINGHOUSE.
LOUIS M. ASPINWALL.

Witnesses as to Geo. Westinghouse:
R. F. Emery,
T. S. Grubbs.

Witnesses as to Louis M. Aspinwall:
R. F. Emery,
Birney Hines.